CONSTANT FREQUENCY DEVIATION NON-DEMODULATING MICROWAVE REPEATER

Filed Jan. 25, 1966

INVENTOR.
DONALD RENKOWITZ

BY R. J. Frank
ATTORNEY.

3,369,180

CONSTANT FREQUENCY DEVIATION NON-DEMODULATING MICROWAVE REPEATER

Donald Renkowitz, Whitestone, N.Y., assignor to General Telephone and Electronics Laboratories, Inc., a corporation of Delaware Filed Jan. 25, 1966, Ser. No. 522,941
3 Claims. (Cl. 325—11)

ABSTRACT OF THE DISCLOSURE

A non-demodulating microwave repeater wherein the frequency deviation of the received signal is maintained constant is described. The repeater heterodynes the received signal to an intermediate frequency signal which is then divided by N, converted up by heterodyning and multiplied by N to the transmitted signal frequency. The multiplication of the up-converted signal enables the carrier signal source to operate at a frequency substantially lower than the transmitted signal frequency.

Figure 1:
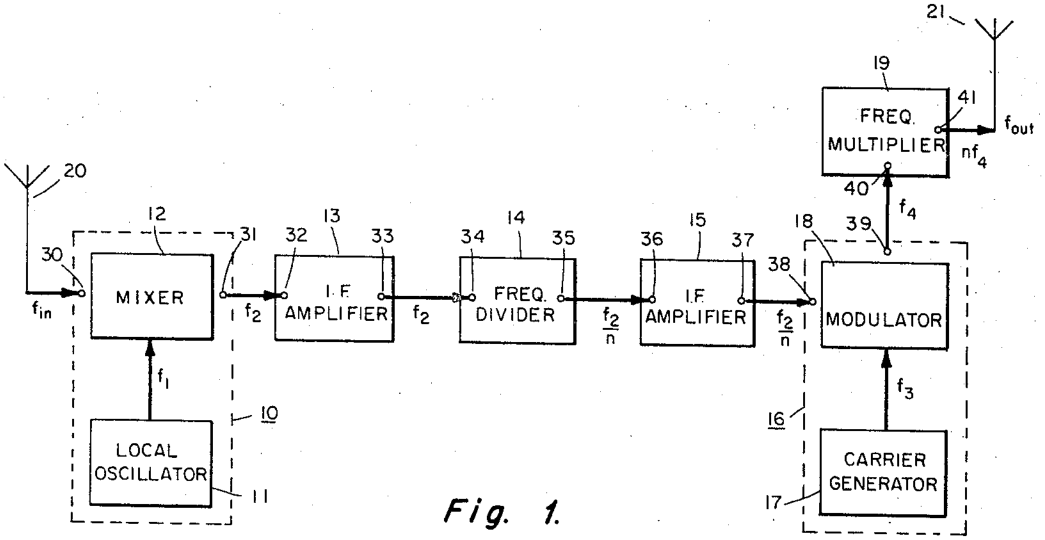

This invention relates to microwave repeaters and more particularly to a non-demodulating repeater.

In the transmission of microwave signals, generally those signals having frequencies of 1 gc. or above, the propagation characteristics of the path between the transmitting and receiving sites limit the distance by which the transmitter and receiver may be separated. The use of microwave repeaters disposed in the path of the signals enables the overall path length to be greatly increased and the received signal to be increasingly independent of changes in the atmospheric conditions.

Today all but the shortest microwave systems use intermediate repeaters to provide gain and direction for the signal. These repeaters are spaced between the transmitter and receiver and generally consist of a receiver and transmitter through which the signal may pass. Since the signal is normally received and transmitted by a succession of repeaters, any degradation or distortion of the signal introduced by the repeaters is cumulative.

Repeaters may be categorized as either demodulating or non-demodulating. In the demodulating repeater, often referred to as a baseband repeater, the received microwave signal is converted to an intermediate-frequency signal, amplified, demodulated to recover the baseband of frequencies containing the signal channels, and amplified again at the baseband frequency. Finally it is remodulated for transmission in the microwave frequency range. Since the full baseband of frequencies is available, any desired number of signal channels may be readily separated from the rest of the baseband by appropriate filters. Other channels can then be inserted into the frequency "slot" left by the dropped channels.

In a non-demodulating repeater, amplification is provided at the intermediate-frequency, or IF, stage without going through the demodulation and remodulation process. As in the demodulating repeater, the received microwave signal is converted to an IF signal. However, this signal is amplified and then converted up to the desired microwave frequency without undergoing demodulation and remodulation. Each time a signal is modulated or demodulated it picks up a certain amount of intermodulation noise. As a result, the non-demodulating repeater exhibits improved noise performance as compared to the demodulating repeater.

Since the baseband of frequencies is not readily available in the non-demodulating repeater, this type of repeater is normally alternated with demodulating repeaters in areas where signal channels are to be separated from the rest of the baseband. However in those areas wherein no signal channels are to be separated and recovered, the low noise performance of non-demodulating repeaters substantially favors their use rather than the demodulating type.

The generation of sufficient power from solid-state transmitters at frequencies in the range of 1 to 6 gc. is presently obtained through the use of microwave varactor diodes. One suitable solid-state power source is described in an article entitled "Solid-State 1-Watt FM Source at 6 gc." by E. A. Murphy, W. Posner and D. Renkowitz, appearing in the "Digest of Technical Papers—1965 International Solid-State Circuits Conference" at pp. 104–105. Power sources of this type are incorporated in microwave repeaters as the carrier generators employed to convert the IF signal up to the desired microwave frequency.

However obtaining suitable solid-state power sources at higher common-carrier frequencies, for example 10.55 to 16 gc., is found difficult due in part to the more stringent filter requirements and poorer varactor performance at these frequencies. As a result, microwave repeaters operating in the 12 gc. band have been fabricated from existing 6 gc. band repeaters by passing the output of a 6 gc. repeater through a frequency doubler to produce the higher frequency signal.

This technique multiplies not only the carrier frequency but also the sidebands of the frequency-modulated carrier. As a result, the frequency deviation, and therefore the modulation index, is multiplied. The frequency deviation is defined as the peak difference between the instantaneous frequency of the FM signal and the carrier frequency. The modulation index, which is the ratio of the frequency deviation to the frequency of the modulating signal, is also multiplied since the frequency of the modulating signal is not changed by the multiplication.

Multiplying the frequency deviation of an FM signal also multiplies the bandwidth of the signal. In the case of a demodulating repeater wherein the baseband is recovered prior to retransmission, the increase in the frequency deviation is not cumulative. However in non-demodulating frequencies, wherein the original frequency deviation is not restored at each reepater, the multiplication of the frequency deviation is cumulative. The steady increase in frequency deviation means that larger and larger bandwidths are required for the same number of signal channels.

Accordingly, an object of the present invention is to provide an improved microwave repeater wherein the modulating signal may be multiplied to higher frequencies without increasing the frequency deviation.

Another object is to provide an improved non-demodulating microwave repeater for high frequency signals.

A further object is to provide a constant frequency deviation non-demodulating repeater wherein the frequency of the carrier source is substantially lower than the frequency of the transmitted signal.

A microwave repeater amplifies and redirects a received modulated signal. In the present invention, a repeater is provide which converts the received signal to a first intermediate-frequency or IF signal. The conversion changes the frequency of the signal but does not change the frequency deviation $\Delta F$ or the modulation index $mf$. The first IF signal is amplified to a higher power level and then its frequency is divided by a factor N to a lower frequency. This signal, referred to herein as the second IF signal, is a modulated signal having a frequency deviation equal to the original frequency deviation $\Delta F$ divided by N and a power level substantially higher than the received signal.

The second IF signal is then up-converted to a third

IF signal having a frequency equal to the frequency of the received signal divided by a factor of approximately N. The up-conversion does not change the frequency deviation of the modulated second signal. This third IF signal is multiplied by a factor N and then transmitted. The multiplication increases the frequency deviation such that it equals the frequency deviation ΔF of the received signal.

The up-conversion of the second IF signal is provided by heterodyning the second IF signal with the output signal of a carrier generator. Since the heterodyne frequency conversion occurs prior to multiplication, the frequency of the output signal of the carrier generator is in a lower frequency band than the transmitted signal. As a result, existing solid-state carrier generators may be employed in repeaters operating at high micro-wave frequencies.

In one embodiment of the invention, the received microwave signal is supplied to a first heterodyne means wherein it is mixed to a first intermediate frequency. The output terminal of the first heterodyne means is coupled to the input terminal of an intermediate-frequency amplifier. The amplifier raises the power level of the first IF signal. The output terminal of the amplifier is coupled to the input terminal of a frequency divider which divides the frequency of the first IF signal by a factor N. The second IF signal appearing at the output terminal of the frequency divider is characterized by a high power level and a frequency deviation that is equal to the frequency deviation of the received signal ΔF divided by the factor N.

The output terminal of the frequency divider is coupled to the input terminal of a second heterodyne means which up-converts the second IF signal to a higher frequency third IF signal. The frequency of the third IF signal is equal to the frequency of the transmitted signal frequency divided by the factor of N. As is well known, the heterodyning of an IF signal and a carrier signal does not vary the frequency deviation of modulation index in the process of frequency conversion.

Therefore, the signal appearing at the output terminal of the second heterodyne means has a frequency deviation that is equal to the frequency deviation of the received signal divided by the factor of N. The output terminal of the second heterodyne means is coupled to the input terminal of a frequency multiplier. The multiplier multiplies the frequency of the third IF signal and its frequency deviation by the factor of N. The signal appearing at the output terminal of the multiplier is then the signal to be transmitted with its original frequency deviation restored and having an increased power level.

Figure 2:
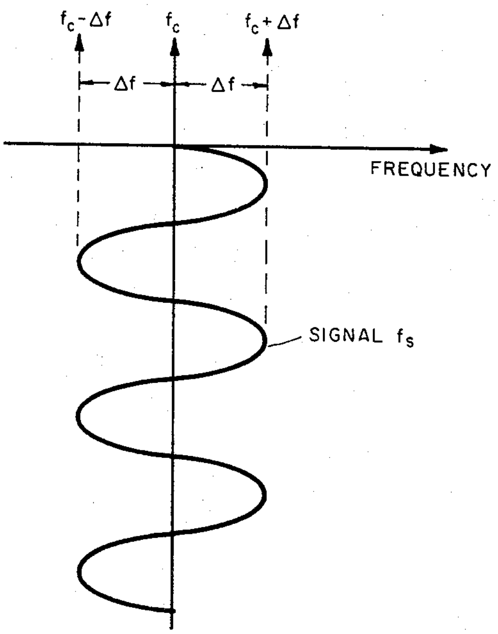

Further features and advantages of the invention will become more readily apparent from the following description of a specific embodiment taken in conjunction with the accompanying drawings, in which FIG. 1 is a block schematic diagram of one embodiment of the invention, and FIG. 2 graphically illustrates the frequency deviation of a frequency-modulated signal.

Referring to FIG. 1, a modulated microwave signal $f_{in}$ having a frequency, for example, of 12 gc. is received by antenna 20 which, in turn, is coupled to the input terminal 30 of a first heterodyne circuit 10. The received signal, shown in FIG. 2, is generally a frequency-modulated, or FM, signal comprising a carrier having a nominal frequency $f_c$ which is varied in accordance with the magnitude of a modulating signal having a frequency $f_s$. The variation in the instantaneous frequency of the FM signal is shown in FIG. 2 as ±ΔF. The quantity ΔF is the frequency deviation and is independent of the signal frequency $f_s$.

The first heterodyne circuit comprises a mixer 12 and a local oscillator 11. The local oscillator provides the local frequency signal $f_1$ of 12.14 gc.$_4$ required to beat with the received signal $f_{in}$ to produce the desired intermediate frequency signal. As well known, the mixer combines the received and local signals to produce a signal having the sum- and difference-frequencies, either of which may be selected by tuning the mixer or filtering its output. In this case, the mixer is tuned such that the difference frequency signal appears at the output terminal 31. This signal $f_2$, referred to as the first IF signal, is a low power, relatively low frequency signal and contains the sidebands or modulation. In this embodiment, this signal is equal to 140 mc. plus the accompanying sidebands. Since the heterodyning takes place at a relatively low power level, the local oscillator may consist of a low frequency source and a number of frequency multipliers.

The first IF signal is supplied to the input terminal 32 of a tuned IF amplifier 13. The amplifier increases the power level of the first IF signal. The output terminal 33 of amplifier 13 is coupled to the input terminal of frequency divider 14. The frequency divider divides the frequency of the first IF signal by a factor N such that the signal appearing at output terminal 35 has a frequency $f_2/N$. The frequency division provided by divider 14 may be attained by the use of high-speed multivibrators or varactor frequency dividers. A detailed description of the design of suitable varactor frequency dividers is found in the reference entitled "Varactor Applications" by P. Penfield, Jr. and R. P. Rafuse, MIT Press 1962 at page 436. In the above embodiment, the factor N equals 2 and the frequency of the second IF signal is nominally 70 mc.

The output terminal 35 of divider 14 is coupled to the input terminal 36 of a second IF amplifier 15. The second amplifier, which is optional depending on the amount of gain required for the repeater, increases the power level of the second IF signal. Typically, the power output of a repeater is from 55 to 105 db higher than the received power.

The second IF signal is coupled from output terminal 37 of the second amplifier to input terminal 38 of second heterodyne circuit 16. This circuit up-converts the relatively high power second IF signal of 70 mc. to a third IF signal $f_4$ of 6.07 gc. Circuit 16 is comprised of a carrier generator 17 which provides a carrier signal $f_3$ having a frequency of 6.00 gc. and a modulator 18 coupled thereto. Modulator 18 up-converts the carrier signal so that the signal $f_4$ appearing at output terminal 39 is the sum of the second IF and the carrier signals. The signal $f_4$ has a frequency of 6.07 gc. A suitable heterodyne circuit for use in the above embodiment is described in an article entitled "Solid-State 1-Watt FM Source at 6 gc." appearing in the "Digest of Technical Papers—1965 International Solid-State Circuits Conference" at pp. 104–105.

The second heterodyne circuit is selected such that the frequency of the third IF signal $f_4$ is equal to the frequency of the required output signal to be transmitted divided by the factor N. This enables a relatively low frequency high power generator to be employed. Since in practice it is common to transmit at a frequency slightly different from the received signal in order to provide isolation between receiver and transmitter, the third IF signal $f_4$ is selected to have a frequency equal to that of the received signal divided by a factor of approximately N rather than N itself.

The output terminal 39 of second heterodyne circuit 16 is coupled to input terminal 40 of frequency multiplier 19. The multiplier 19 multiplies the frequency of the third IF signal $f_4$ by a factor N, in this case 2, so that the signal coupled to antenna 21 for transmission has a frequency of 12.14 gc. One type of frequency multiplier suitable for use as multiplier 19 is described in the above-cited article entitled "Solid-State 1-Watt FM Source at 6 gc." In addition, a detailed description of the design of suitable varactor frequency multipliers is found in the reference entitled "Varactor Applications" by P. Penfield, Jr., and R. P. Rafuse, MIT Press 1962 at p. 257.

The frequency deviation is unchanged by the first and second heterodyne circuits 10 and 16 and the first and second amplifiers 13 and 15. However, the process of frequency division and/or multiplication does change the deviation. The frequency divider 14 reduces the frequency deviation as well as the frequency by a factor N since the quantity $\Delta F$ is divided. Conversely, multiplication increases the frequency deviation by N.

The use of the frequency divider 14 and the frequency multiplier 19 insure that the frequency deviation and therefore, the bandwidth of the FM signal is maintained constant. In addition, the frequency of signal $f_3$ provided by the carrier generator 17 need not be in the same frequency band as the transmitted signal. As a result, relatively low microwave frequency solid-state transmitters may be incorporated in repeaters employed in higher band microwave relay systems.

While the above description has referred to a specific embodiment of the invention, it will be apparent that many modifications and variations may be made therein without departing from the spirit and scope of the invention.

What is claimed is:

1. A repeater for amplifying a received microwave signal prior to transmission which comprises:

(a) first heterodyne means having an output terminal, said means converting the received microwave signal to a first intermediate-frequency signal, said received signal having a predetermined frequency deviation;

(b) a first amplifier having an input terminal and an output terminal, said input terminal being coupled to the output terminal of said first heterodyne means;

(c) a frequency divider having an input terminal and an output terminal, said input terminal being coupled to the output terminal of said first amplifier, said divider dividing the frequency of said first intermediate-frequency signal by a factor N to provide a second intermediate-frequency signal at its output terminal, said divider dividing said predetermined frequency deviation by the factor N.

(d) second heterodyne means having an input terminal and an output terminal, said input terminal being coupled to the output terminal of said frequency divider, said means converting said second intermediate-frequency signal to a third intermediate-frequency signal, said third signal having a frequency equal to the frequency of said received signal divided by a factor of N and a frequency deviation equal to said predetermined frequency deviation divided by the factor N; and (e) a frequency multiplier having an input terminal and an output terminal, said input terminal being coupled to the output terminal of said second heterodyne means, said multiplier multiplying the frequency and the frequency deviation of said third intermediate-frequency signal by the factor N, the signal at the output terminal of said multiplier having a frequency deviation equal to that of the received signal.

2. Apparatus in accordance with claim 1 in which said second heterodyne comprises:

(a) a modulator having first and second input terminals and an output terminal, said first input terminal being coupled to the output of said frequency divider, said output terminal being coupled to the input terminal of said multiplier, and (b) a carrier generator having an output terminal coupled to the second input terminal of said modulator, said carrier generator providing a signal having a frequency equal to the frequency of said received signal divided by a factor of approximately N.

3. Apparatus in accordance with claim 2 further comprising a second amplifier having an input terminal and an output terminal, said input terminal being coupled to the output terminal of said divider, said output terminal being coupled to the input terminal of said modulator.

References Cited

UNITED STATES PATENTS

| | | | |
|---|---|---|---|
| 2,406,932 | 9/1946 | Tunick | 325—7 |
| 2,407,212 | 9/1946 | Tunick | 325—11 X |
| 2,407,213 | 9/1946 | Tunick | 325—11 X |
| 2,813,977 | 11/1957 | Carter | 325—146 X |

ROBERT L. GRIFFIN, *Primary Examiner.*

JOHN W. CALDWELL, *Examiner.*

B. V. SAFOUREK, *Assistant Examiner.*